United States Patent [19]

Lipschutz

[11] 4,282,730
[45] Aug. 11, 1981

[54] ANTI-THEFT DEVICES FOR AUTOMOBILE VEHICLES
[75] Inventor: Paul Lipschutz, Croissy, France
[73] Assignee: Neiman S.A., Courbevoie, France
[21] Appl. No.: 33,294
[22] Filed: Apr. 25, 1979
[30] Foreign Application Priority Data
May 24, 1978 [FR] France .................. 78 15385
[51] Int. Cl.³ .............. E05B 65/12; F16B 2/08
[52] U.S. Cl. .......................... 70/184; 70/18; 70/211; 70/451; 70/461; 248/231; 285/177; 285/199; 403/234; 403/237
[58] Field of Search ............... 70/184, 185, 186, 252, 70/211, 233, 451, 15, 18, 461; 248/231; 285/199, 197; 403/234, 237

[56] References Cited
U.S. PATENT DOCUMENTS

| 812,625 | 2/1906 | Weston | 285/197 |
|---|---|---|---|
| 1,117,510 | 11/1914 | Malone et al. | 70/461 X |
| 1,178,320 | 4/1916 | Jones | 248/231 X |
| 1,331,942 | 2/1920 | Ritter | 70/185 |
| 1,469,772 | 10/1923 | Chapman | 70/18 |
| 2,118,394 | 5/1938 | Bullis | 70/451 |
| 3,331,622 | 7/1967 | Bagnulo | 285/199 X |
| 3,854,685 | 12/1974 | Parduhn | 248/231 X |
| 3,888,446 | 6/1975 | O'Brien et al. | 248/231 |
| 3,894,707 | 7/1975 | Heard | 248/231 |
| 4,094,612 | 6/1978 | Krieg | 248/231 X |

FOREIGN PATENT DOCUMENTS

| 970792 | 7/1975 | Canada | 285/197 |
|---|---|---|---|
| 1090903 | 10/1960 | Fed. Rep. of Germany | 285/199 |
| 1137910 | 10/1962 | Fed. Rep. of Germany | 285/199 |
| 633659 | 10/1927 | France | 248/231 |
| 1012372 | 7/1952 | France | 70/186 |
| 158298 | 2/1921 | United Kingdom | 70/186 |

Primary Examiner—James T. McCall
Assistant Examiner—Carl F. Pietruszka
Attorney, Agent, or Firm—James C. Wray

[57] ABSTRACT

The invention relates to anti-theft devices for automobile vehicles in which such devices are fixed on the steering column of the vehicle and the aim of the invention is to provide anti-theft steering device which can be adapted to steering column of differing diameters while retaining the necessary security of the fixing. The device comprises a casing containing a locking bolt operated by a security lock and a base to which the casing is secured by means of screws with breakaway heads. The base has a half bore corresponding to the steering column to be equipped with the device and is secured by a flexible member whose first end is selectively fixed by a pin at one of several discrete locations and whose other end is secured to the base in an adjustable manner.

4 Claims, 6 Drawing Figures

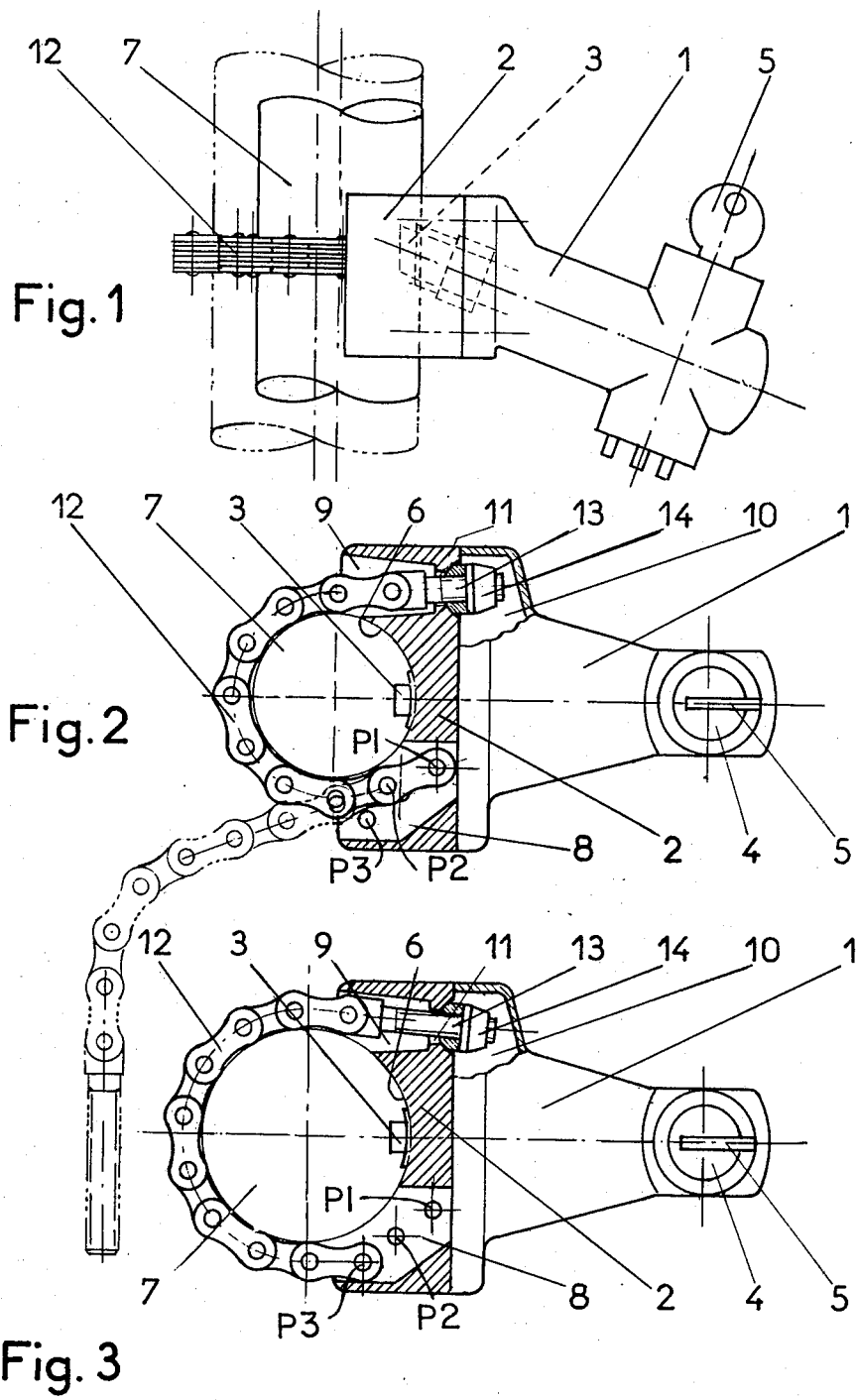

ANTI-THEFT DEVICES FOR AUTOMOBILE VEHICLES

BACKGROUND OF THE INVENTION

The invention relates to anti-theft devices for automobile vehicles, and more particulary to the fixing of such anti-theft devices on the steering column of a vehicle.

STATEMENT OF PRIOR ART

When the fitting of an anti-theft device was not originally foreseen by the designer of an automobile vehicle, in general such an anti-theft device is fixed by clamping around the steering column by means of a clamp and a counter-clamp. To this end the body of the anti-theft device comprises a half-bore forming a clamp which matches the external diameter of the steering column, and a counter-clamp bored to the same diameter is fixed on the anti-theft device body by means of screws having break-off heads, so as to lock the anti-theft device by gripping on the steering column.

By reason of the great diversity of diameters which steering columns possess, it is necessary to have available a large number of anti-theft devices differing from one another only by the diameter of the fixing bore. This considerably increases the cost price due to the multiplication of manufacturing moulds for anti-theft device bodies, and involves large stocks in store for the equipment of all types of vehicles.

OBJECTS OF THE INVENTION

The present invention aims at obtaining an anti-theft device which can be adapted to steering columns of very different diameters, while retaining the necessary security of this fixing.

SUMMARY OF THE INVENTION

According to the invention there is provided a steering anti-theft device for an automobile vehicle, intended to be fitted on the steering column enclosing the steering shaft of the said vehicle, comprising a base portion formed with a groove having a semi-cylindrical surface to permit location of said base portion on the steering column, a body portion attachable to said base portion by means of screws with break-away heads, a locking bolt within said body portion movable between a locking position in which the bolt engages an aperture in the steering shaft and a withdrawn position in which the steering shaft is unlocked, a key-operated security lock within said body portion for effecting movement and locking of said locking bolt, a plurality of discrete locations for selectively receiving pins provided in said base portion, said locations serving to selectively mount a pin arranged parallel to and spaced from the axis of said semi-cylindrical surface at different distances, an elongated flexible element attached at one end to a pin at a selected one of said locations, and adjustable connecting means carried on said base portion for securing the other end of the flexible element to said base portion, whereby after said flexible element has been wrapped around the steering column and said one end attached to the selected location by the pin, the other end of the flexible element is secured to the base portion by said connecting means which are adjusted to tighten the flexible element around said column, whereafter said body portion is attached to said base portion.

With the anti-theft device according to the invention, the body portion and the flexible elongated elements are identical for all steering columns and the base portion will be machined to the diameter of the steering column.

BRIEF DESCRIPTION OF THE DRAWINGS

The invention will be clearly understood on reading of the following description given with reference to the accompanying drawing, wherein:

FIG. 1 is a diagrammatic elevational view of an anti-theft device according to one example of embodiment of the invention, fitted on a steering column of small diameter, FIG. 2 is a plan view, partially borken away, of the assembly according to FIG. 1, FIG. 3 is analogous with FIG. 2, the anti-theft device being fitted on a steering column of large diameter.

DESCRIPTION OF THE PREFERRED EMBODIMENT

Figure 4:
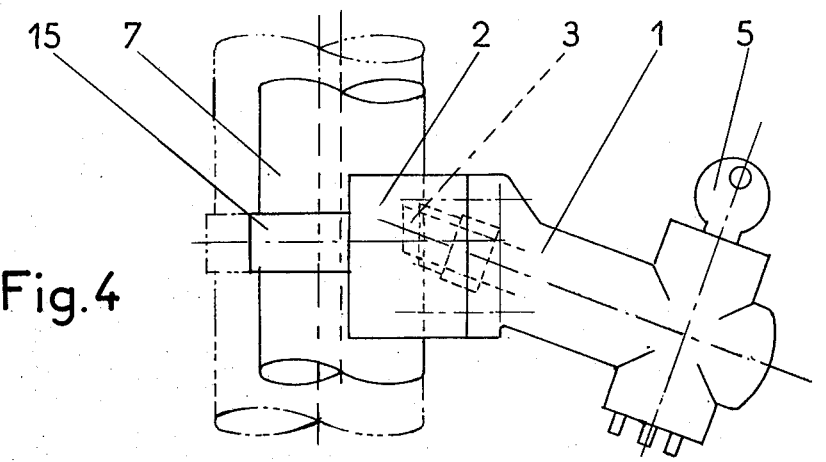
FIGS. 4, 5 and 6 are analogous respectively with FIGS. 1, 2 and 3, but for a variant of the invention.

Reference will be made first of all of FIGS. 1 to 3. The anti-theft device comprises a body 1 fixed on a base 2 by screws with breakaway head (not shown). The body 1 contains a locking bolt 3 operated by a security lock 4 itself controlled by a key 5. The base 2 comprises, opposite to the body 1, a semi-cylindrical bore 6 the diameter of which corresponds to that of a steering column 7 on which the anti-theft device is to be fixed.

The base 2 further comprises, in the vicinity of one edge of the bore 6, a recess 8 equipped with three apertures providing locations for selectively mounting pins parallel with the column 7, numbered P1, P2, P3, which progressively approach the axis of the column. In the viciniy of the opposite edge of the bore 6 the base 2 comprises a bore 9 opening into a recess 10 of the body 1 through a passage 11 of small diameter. After wrapping the chain 12 around the steering column 7, the end link of the chain 12 is fixed on the pin inserted in one locatin, for example, P1 as shown in FIG. 2. The other extremity of chain 12 is terminated by a threaded tie rod 13 which passes through the bore 9 and upon which a nut 14 is screwed, before the fitting of the body 1, so as to tighten the chain around the column 7. In the case of a column of small diameter (FIG. 2) the tie rod 13 can be cut short and an end of chain 12 may be mounted on a pin in aperture P1 so as to reduce the effective length of the chain.

In the case of a column of greater diameter, the fixing of the first extremity of the chain can be effected on the pin using aperture P2, or for still larger diameters on the pin using aperture P3 (FIG. 3). The total effective length of the chain can then be further increased by leaving the tie rod 13 intact.

Figure 5:
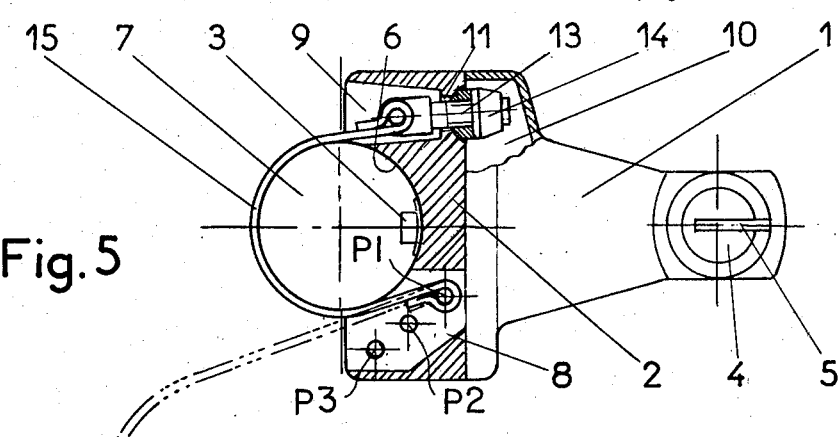
Figure 6:
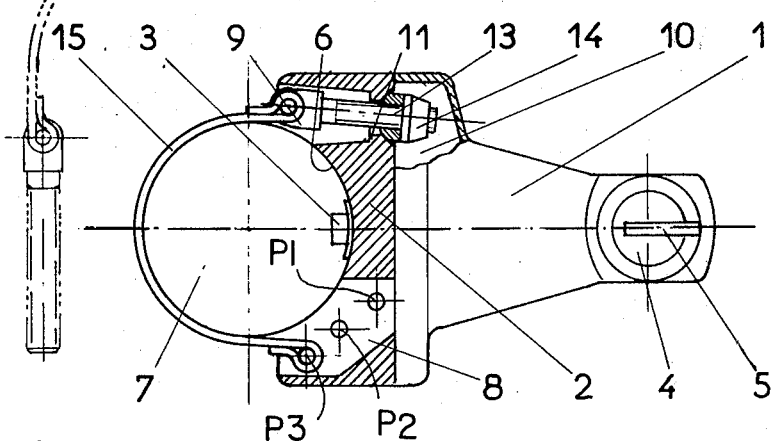

In the form of embodiment according to FIGS. 4 to 6, where the same references designate the same elements as in FIGS. 1 to 3, the chain 12 has been replaced by a steel strip 15. The strip 15 can equally be replaced by a stack of several strips.

I claim:

1. A steering anti-theft device for an automobile vehicle, intended to be fitted on the steering column enclosing the steering shaft of the said vehicle, comprising
   (a) a base portion formed with a groove having a semi-cylindrical surface to permit location of said base portion on the steering column, (b) a body portion attachable to said base portion by means of screws with break-away heads, (c) a locking bolt within said body portion movable between a locking position in which the bolt engages an aperture in the steering shaft and a withdrawn position in which the steering shaft is unlocked, (d) a key-operated security lock within said body portion for effecting movement and locking of said locking bolt, (e) a plurality of discrete locations provided in said base portion each location capable of selectively and fixedly mounting pins arranged parallel to and spaced from the axis of said semi-cylindrical surface at different distances, (f) an elongated flexible element attached at one end to a selected one of said locations by a pin, and (g) adjustable connecting means on said base portion for securing the other end of the flexible element to said base portion, whereby after said flexible element has been wrapped around the steering column and said one end attached to the base at the selected location by the pin, the other end of the flexible element is secured to the base portion by said connecting means which are adjusted to tighten the flexible element around said column, whereafter said body portion is attached to said base portion.

2. A steering anti-theft device according to claim 1, wherein said adjustable connecting means comprises a threaded tie rod passing through a bore of the said base portion and a nut is screwed on said tie rod.

3. A steering anti-theft device according to claim 1, wherein the said elongated flexible element comprises a chain.

4. A steering anti-theft device according to claim 1, wherein the said elongated flexible element is formed by at least one steel strip.

* * * * *